United States Patent [19]

Rogers

[11] Patent Number: 4,545,557
[45] Date of Patent: Oct. 8, 1985

[54] ARTICULATED MOUNTING MEANS FOR POLES, ANTENNAS AND THE LIKE

[76] Inventor: Bernard J. D. Rogers, 52 Hewitt Way, Booragoon, Western Australia, Australia

[21] Appl. No.: 516,547

[22] Filed: Jul. 22, 1983

[51] Int. Cl.⁴ .......................................... A01K 97/10
[52] U.S. Cl. .................................................. 248/516
[58] Field of Search .............. 248/514, 515, 516, 517, 248/240, 240.4; 108/48; 116/173, 63 R

[56] References Cited

U.S. PATENT DOCUMENTS

| | | | |
|---|---|---|---|
| 419,137 | 1/1890 | Bobemerith | 248/515 |
| 970,777 | 9/1910 | Ackerman | 248/240.4 |
| 2,727,707 | 12/1955 | Wells | 248/514 |
| 2,740,219 | 4/1956 | Harden | 248/514 |
| 2,898,065 | 8/1959 | Ackley | 248/515 |
| 2,985,414 | 5/1961 | Ince | 248/515 |
| 3,162,408 | 12/1964 | Markman | 248/515 |
| 3,724,791 | 4/1973 | Mason | 248/515 |
| 3,783,547 | 1/1974 | Bystrom | 248/516 |

FOREIGN PATENT DOCUMENTS

| | | | |
|---|---|---|---|
| 106352 | 1/1927 | Austria | 248/240 |
| 544020 | 9/1922 | France | 248/514 |
| 552331 | 4/1923 | France | 248/514 |
| 663788 | 8/1929 | France | 248/240 |

*Primary Examiner*—J. Franklin Foss
*Assistant Examiner*—Robert A. Olson
*Attorney, Agent, or Firm*—Harness, Dickey & Pierce

[57] ABSTRACT

A device for mounting poles, antennas, and the like on a suitable surface of a small vessel. The device comprises a tubular member having universal mounting means at one end and open at the other end, a supporting arm one end of which is connected to the tubular member adjacent the open end thereof, the other end of the arm being pivotally mounted on a bracket spaced apart from and adapted to be attached to the same surface as the universal mounting means, and means for locking the arm in the desired position with respect to the bracket.

1 Claim, 8 Drawing Figures

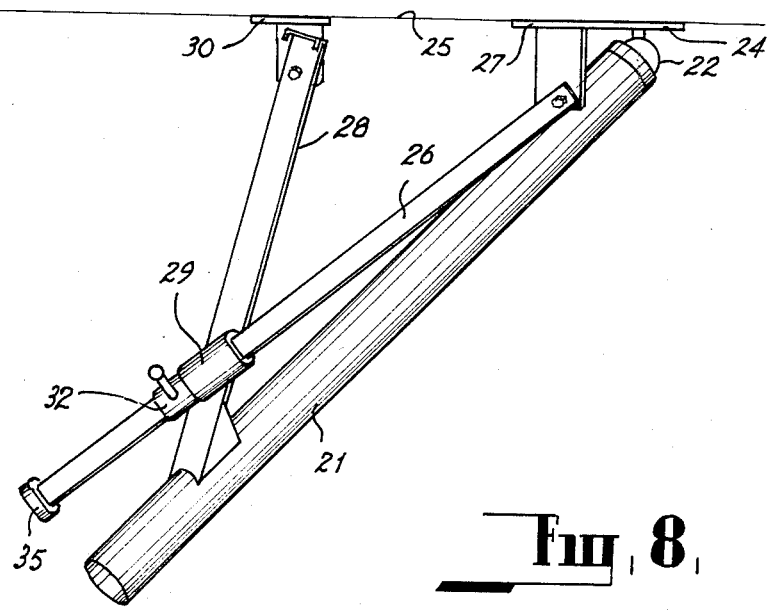
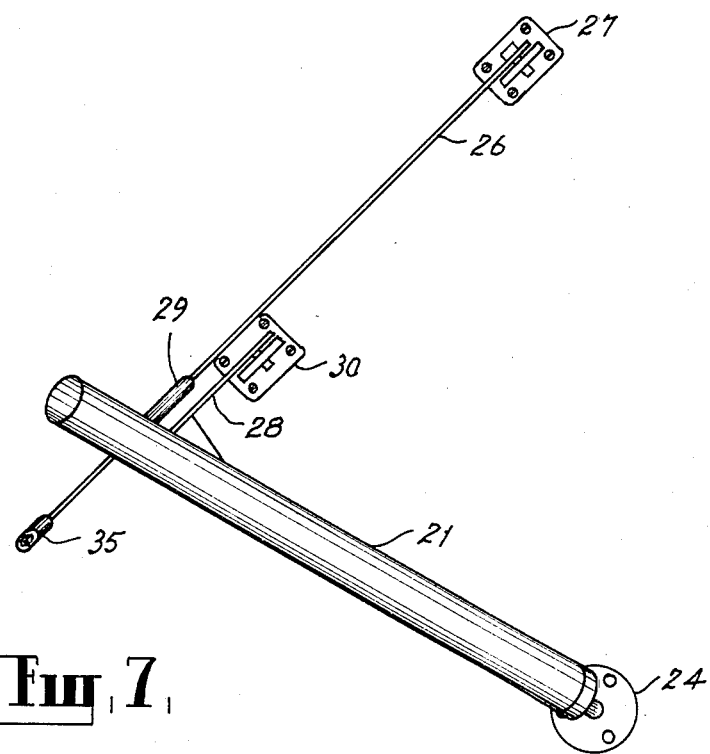

ARTICULATED MOUNTING MEANS FOR POLES, ANTENNAS AND THE LIKE

This invention relates to articulated means for mounting fishing poles, radio antennas and the like on fishing boats or on other types of vehicles as may be required.

The object of the invention is to provide means whereby a fishing pole or radio antenna can be mounted on a boat of other vehicle and readily moved between a storage or inoperative position and an operative position.

In one form the invention resides in a device for mounting poles, antennas, and the like on a surface comprising a tubular member having universal mounting means at one end and open at the other end, a supporting arm one end of which is connected to the tubular member adjacent the open end thereof, the other end of the arm being pivotally mounted on a bracket spaced apart from and adapted to be attached to the same surface as the universal mounting means, and means for locking the arm in the desired position with respect to the bracket.

The invention will be better understood by reference to the following description of the specific embodiments shown in the accompanying drawings wherein:

FIG. 7 is an elevation showing the second embodiment in the operative position; and FIG. 8 is a plan view showing the second embodiment in the operative position.

Figure 2:
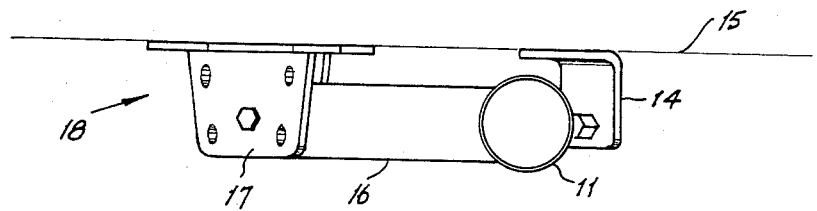
FIG. 2 is a plan view of the unit of FIG. 1.

In the embodiment shown in FIGS. 1 to 4 of the drawings the tubular cylindrical member 11 is fitted at one end onto a ball 12 supported by a shaft 13 carried by a mounting plate 14 adapted to be screwed or otherwise fastened to a vertical surface 15 on a suitable portion of a vessel. One end of a supporting arm 16 is welded to the cylindrical member 11 adjacent the other end thereof, which end is open so that the end of a fishing pole or radio antenna can be inserted thereon. The other end of the arm 16 is pivotally supported between the arms 17 of a bracket 18 also fastened to the surface 15. The arms 17 are provided with a series of holes one of which is adapted to be aligned with a hole in the arm 16 so that a pin 19 can be passed through the aligned holes to lock the cylindrical member in the desired position. The pin 19 is coupled to the end of a length 20 of rope or wire the other end of which is fixed to the arm 16.

Figure 1:
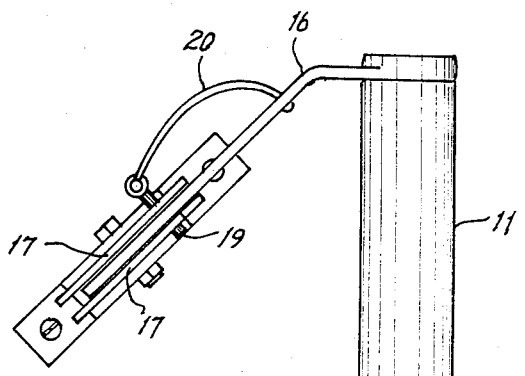
FIG. 1 is an elevation of one embodiment showing it in the inoperative or storage position.
Figure 1:
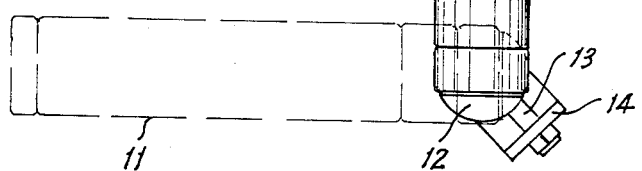
Figure 4:
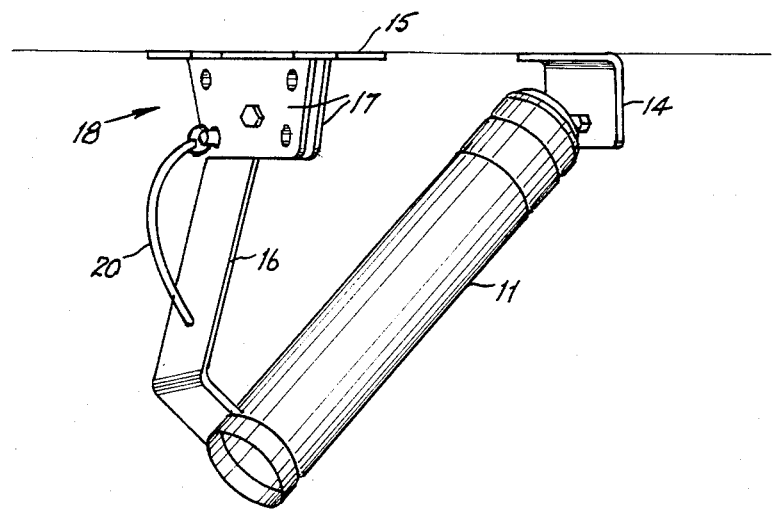
FIG. 4 is a plan showing the unit of FIG. 1 in the operative position.
Figure 3:
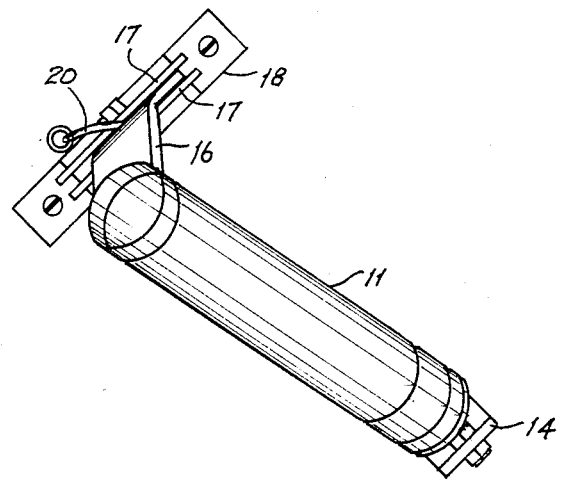
FIG. 3 is an elevation showing the unit of FIG. 1 in the operative position.
Figures 5, 6:
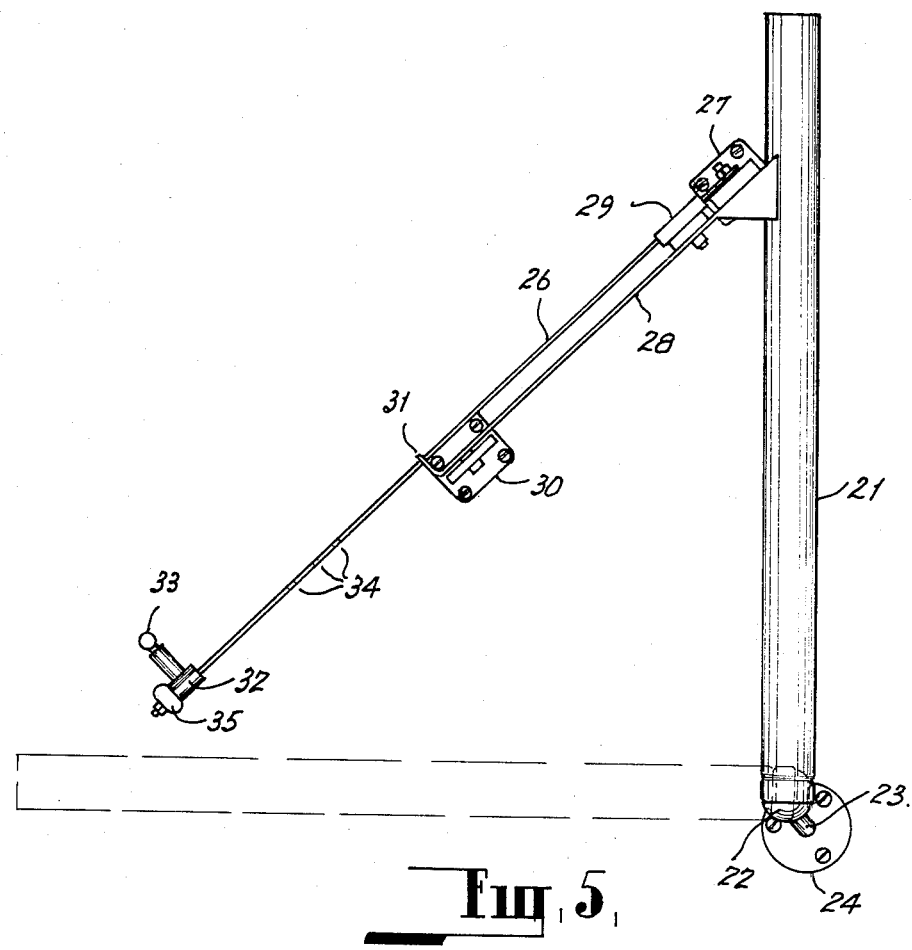
FIG. 5 is an elevation of a second embodiment showing it in the inoperative or storage position.
FIG. 6 is a plan view corresponding to FIG. 5.

In the position shown in FIGS. 1 and 2 of the drawings the cylindrical member 11 is in a storage or inoperative position and lies in a substantially vertical position adjacent the surface 15 on which unit is mounted. In this position a pole or antenna positioned in a cylindrical member will be vertical and lies parallel to the surface 15. When the member 11 is rotated to the position shown in FIGS. 3 and 4 a pole or antenna inserted into the open cylindrical member 11 will be in a position which is inclined rearwardly and outwardly of the boat to hold (in the case of a fishing pole) a fishing line in a suitable position for trolling. To allow the boat to travel under a bridge or other obstruction without removing the pole or antenna the pin 19 is removed and the tubular member 11 rotated to the position shown in broken lines in FIG. 1 so that the pole or antenna lies parallel to the gun whale or deck of the boat. After the bridge has been cleared the pole or antenna can be rapidly returned to the operative position.

In the embodiment shown in FIGS. 5 to 8 of the drawings a tubular member 21 is fitted to one end of a ball 22 supported on a shaft 23 carried by a mounting plate 24 adapted to be screwed or otherwise fastened to a vertical surface 25 of a suitable portion of a vessel as in the first embodiment. One end of an arm 26 is pivotally mounted on a bracket 27 fixed to the surface 25 adjacent the other end or open end of the tubular member 21 when in the vertical position. One end of a second arm 28 is fixed to the tubular member adjacent the open end thereof and the arm 28 is pivotally connected to a carrier 29 slidably mounted on the arm 26. The other end of the second arm 28 is pivotally mounted on a bracket 30 fixed to the surface 25. The bracket 30 is provided with an upwardly projecting lug 31 adapted to engage the arm 26. A stop 32 provided with a locking pin 33 is slidably mounted on the arm 26, the pin 33 being adapted to engage one of series of holes 34 in the arm 26. A retainer 35 is fixed to the free end of the arm 26 to prevent the stop 32 from being disengaged from the arm 26.

As in the first embodiment the lower end of a fishing pole or antenna is positioned in the tubular member 21. To bring the pole or antenna to the operating position, the arm 26 is disengaged from the lug 31 and the assembly rotated to the position shown in FIGS. 7 and 8. The position of the stop 32 determining the angle of inclination of the pole or antenna.

I claim:

1. A device for mounting poles, antennas, and the like on a vertical mounting surface comprising a tubular member having an open end adapted to receive a pole or the like, a first supporting bracket adapted to be affixed to the vertical mounting surface, a ball and socket connection between said first supporting bracket and the other end of said tubular for supporting said tubular member for universal movement relative to the vertical mounting surface, a supporting arm one end of which is rigidly affixed to said tubular member adjacent the open end thereof, a second supporting bracket adapted to be spaced apart from and adapted to be attached to the same vertical surface as said first supporting bracket, said second bracket comprising a pair of spaced apart plates, the other end of said arm extending between said plates of said second bracket and being pivotally connected to said second supporting bracket for movement of said tubular member from a vertical position adjacent and substantially parallel to the vertical mounting surface through intermediate positions in which said tubular member project laterally outwardly and upwardly from the vertical mounting surface to a horizontal position adjacent to and parallel to the vertical mounting surface and means for detachably locking said arm in the desired position with respect to said second supporting bracket for positioning said tubular member in selected positions comprising a plurality of spaced pairs of holes extending through said plates, a corresponding hole extending through said other end of said arm and pin means adapted to extend through selected of said pairs of holes and said arm hole.

* * * * *